May 16, 1967 R. K. VIRGIL 3,319,606
CHICKEN FEEDING AND MAINTAINING APPARATUS
Filed Aug. 2, 1965 5 Sheets-Sheet 1

INVENTOR.
RICHARD K. VIRGIL
BY
Eugene C. Knoblock
ATTORNEY

May 16, 1967  R. K. VIRGIL  3,319,606
CHICKEN FEEDING AND MAINTAINING APPARATUS
Filed Aug. 2, 1965  5 Sheets-Sheet 2

INVENTOR.
RICHARD K. VIRGIL
BY
Eugene C. Knoblock
ATTORNEY

May 16, 1967
R. K. VIRGIL
3,319,606
CHICKEN FEEDING AND MAINTAINING APPARATUS
Filed Aug. 2, 1965
5 Sheets-Sheet 3
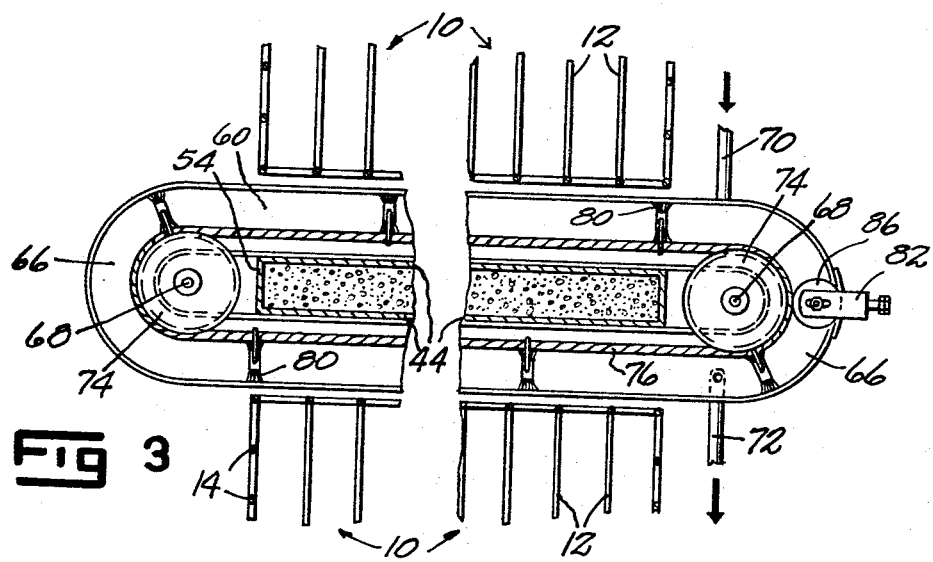
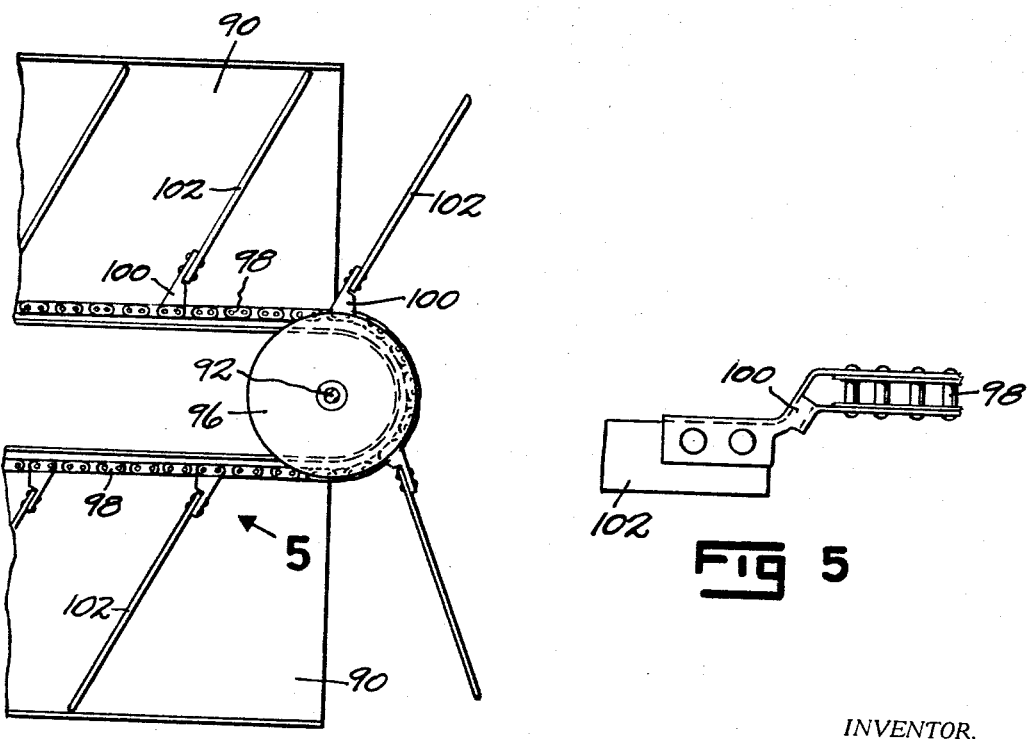
INVENTOR.
RICHARD K. VIRGIL
BY Eugene G. Knoblock
ATTORNEY May 16, 1967 R. K. VIRGIL 3,319,606
CHICKEN FEEDING AND MAINTAINING APPARATUS
Filed Aug. 2, 1965 5 Sheets-Sheet 5
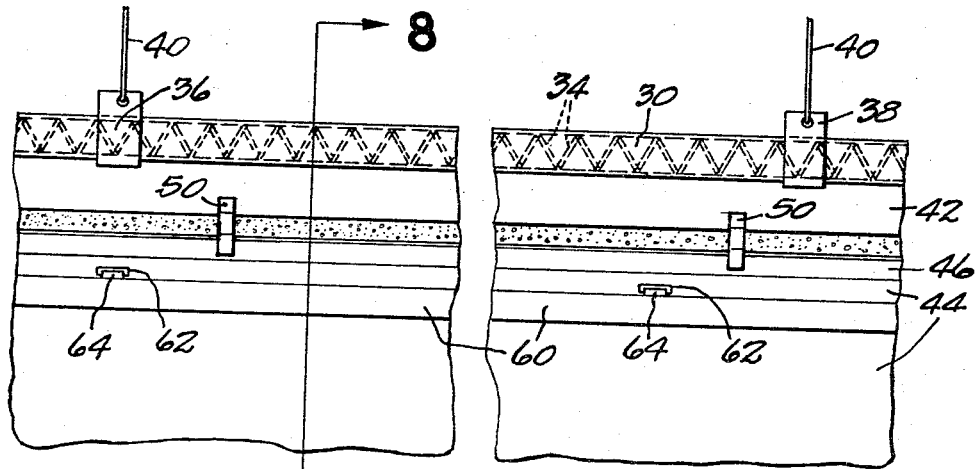
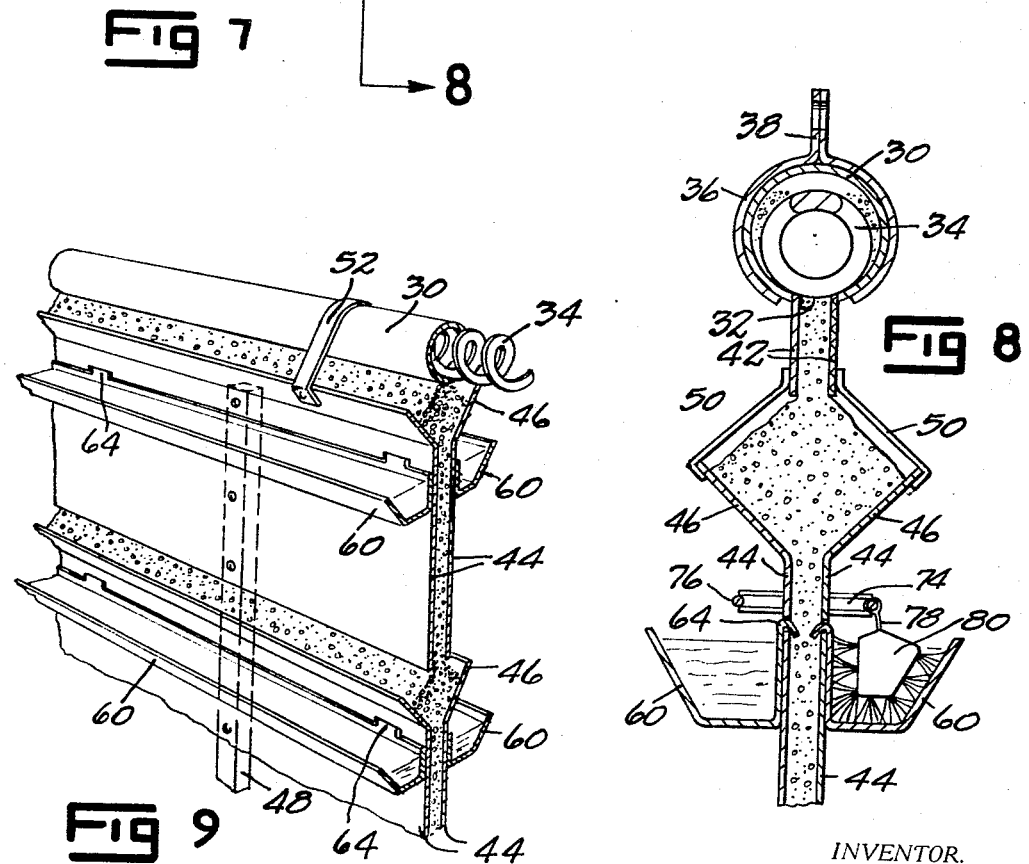
INVENTOR.
RICHARD K. VIRGIL
BY Eugene C. Knoblock
ATTORNEY

United States Patent Office 3,319,606
Patented May 16, 1967

3,319,606
CHICKEN FEEDING AND MAINTAINING
APPARATUS
Richard K. Virgil, Cassopolis, Mich.; Florence Virgil, executrix of the estate of said Richard Virgil, deceased, assignor to Florence Virgil
Filed Aug. 2, 1965, Ser. No. 476,605
6 Claims. (Cl. 119—51)

This invention relates to improvements in chicken feeding and maintaining apparatus. More particularly the invention relates to equipment associated with cages in which chickens are confined.

The problem of feeding and maintaining chickens confined in cages entails many elements, such as the assured supply of food available to all fowl within the cages, the assured supply of adequate source of water, the avoidance of clogging water supply troughs, the collection and disposition of droppings, and the collection of eggs. It is a customary practice to arrange cages in rows, with cages in superimposed tiers or stacks. It is necessary that the chickens in all cages in each tier of each row shall have access to an assured supply of food and water, and that means for collecting droppings are effective and prevent discharge of such droppings from the upper tiers to the lower tiers, and that egg collection means are effective at all tiers of each row.

It is important that the amount of time and effort exerted in the attendance to the devices be held at a minimum and that all devices be accessible for attention with minimum difficulty and minimum disturbance to the equipment.

It is the primary object of this invention to provide a novel, simple and inexpensive construction of means for feeding fowl in cages at different tiers or levels in a manner to provide an assured constant supply of feed available at all positions in each tier or level.

A further object is to provide a device of a character wherein an elongated vertical feed retainer is supplied uniformly throughout its length with granular feed material and wherein at spaced elevations openings occur at the sides of the unit at which flared trough defining parts project to afford access to the feed by fowl in cages at levels adjacent thereto.

A further object is to provide an elongated vertical feed unit with means for uniformly filling the same, with plural lateral projections defining troughs from which fowl may eat, and by which are supported vertically spaced water troughs at opposite sides thereof to which fowl have access for drinking water.

A further object is to provide a device of this character having novel fowl watering means consisting of an endless trough traversed by an endless carrier mounting spaced cleaning elements and adapted to be advanced in the trough to entrain and move material precipitated at the bottom of the trough so that it is carried to a discharge outlet.

A further object is to provide a device of this character wherein collection means for droppings are interposed between adjacent tiers of cages and endless carrier means traverse such collection means and carry scrapers to scrape the same and advance the material collected to a discharge point.

A further object is to provide means for feeding and watering fowl in stacked cages arranged in rows, wherein the feeding means is interposed between adjacent rows and is supported independently thereof so that it is readily accessible for maintenance and repair by movement of cages in one row only.

A further object is to provide a device of this character with novel egg collecting means.

Other objects will be apparent from the following specification.

In the drawings:

FIG. 3 is a fragmentary horizontal sectional view taken on line 3—3 of FIG. 2;

FIG. 4 is a fragmentary horizontal sectional view taken on line 4—4 of FIG. 2;

FIG. 5 is a fragmentary detail view as observed in the direction of the arrow 5 in FIG. 4;

FIG. 7 is a fragmentary side elevational view of one form of the feeder;

FIG. 8 is a vertical sectional view of the feeder taken one line 8—8 of FIG. 7;

FIG. 9 is a fragmentary perspective view of the feeder unit.

Figure 1:
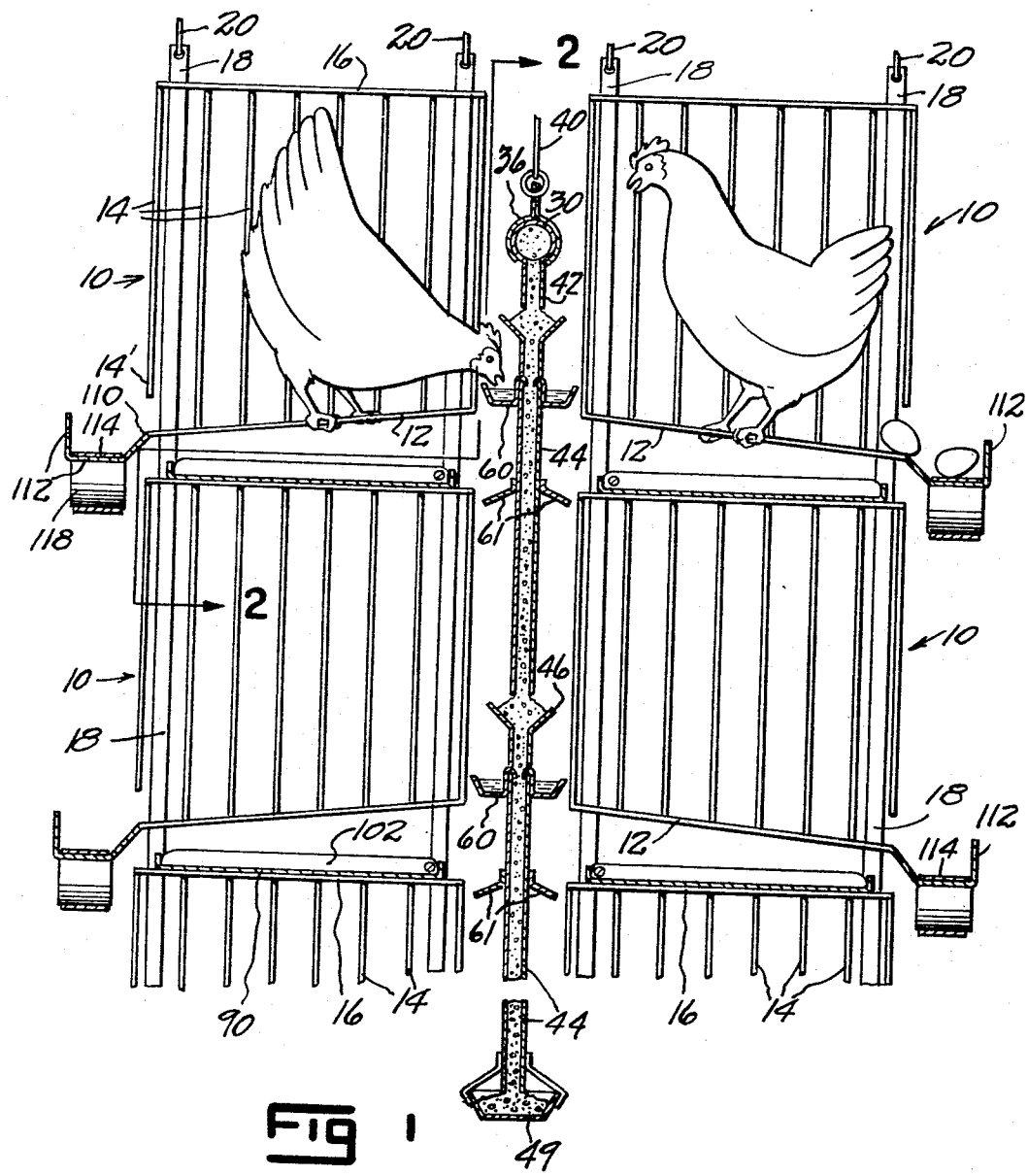
FIG. 1 is an end view showing two rows of cages in superimposed relation with my improved feeding and watering means positioned therebetween.

Referring to the drawings, the numeral 10 designates a wire cage of a size to hold one or more fowl. Each cage has a grilled bottom 12 formed of spaced wires and preferably inclined from an inner to an outer side. A plurality of vertical bars 14 define sides of the cage, and a top grill 16 completes the cage. It will be understood that a suitable door (not shown) will be provided in each cage and suitable latch means for holding the same closed.

Figure 6:
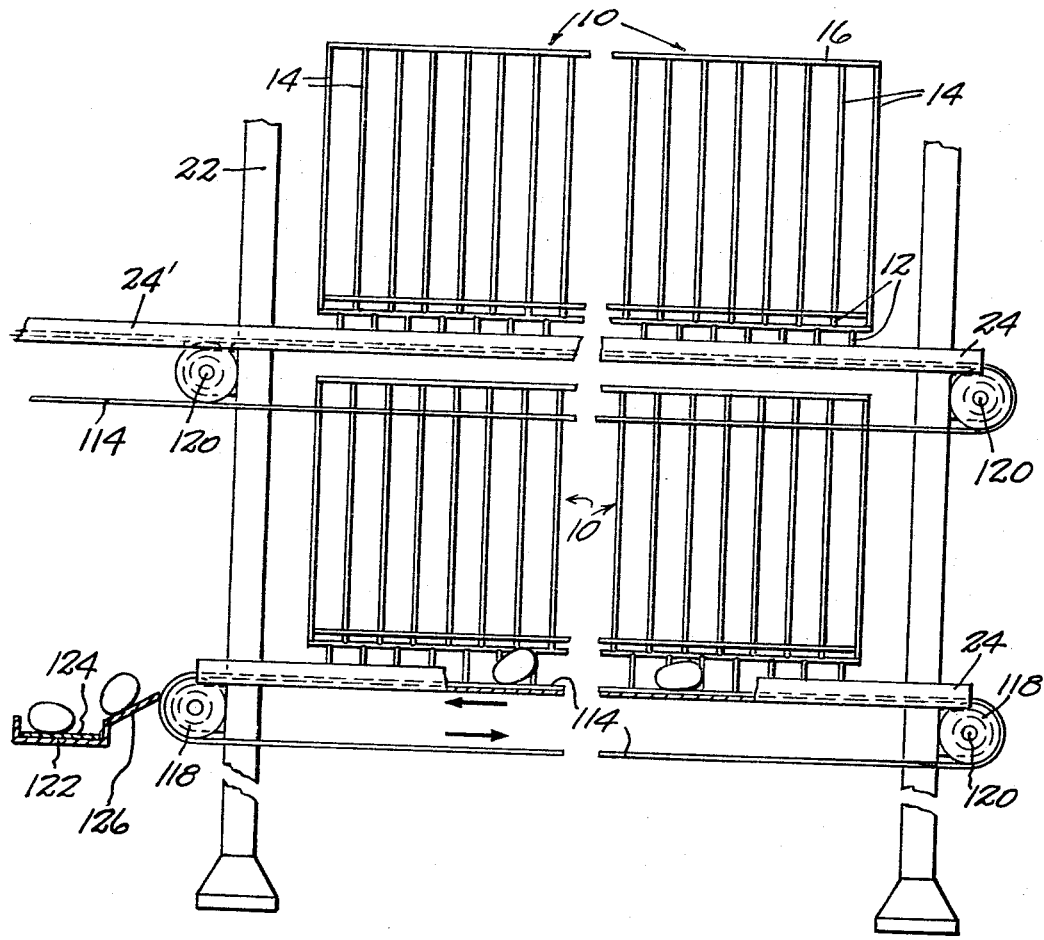
FIG. 6 is a fragmentary side elevational view of another embodiment of the invention.

The wire cages 10 are arranged in rows of any selected length, each made up of a number of cages. By way of example, the rows may be of a length of sixty feet or a hundred feet or more. The cages are also stacked in each row; that is, are arranged in superimposed relation as illustrated in FIGS. 1 and 6, and superimposed cages are spaced apart. In the arrangement illustrated in FIG. 1, the cages are supported in selected spaced relation by upright bars 18 which interconnect the superimposed cages and maintain them in selected spacing, and these bars in turn are preferably suspended from an overhead support, as by means of cables 20 which may be connected to suitable overhead supports to accommodate change of the vertical elevation of the rows and access to the floor space therebelow. In the construction illustrated in FIG. 6, the cages may be supported from the floor by means of uprights 22 interconnected by structural members 24, such as channels or angles which serve to support the cages 10. If desired the uprights 22 may be mounted upon castors to facilitate movement of the cages. In the preferred arrangement the cages are arranged in a building with rows thereof adjacent each other and paired and with aisle space between adjacent pairs; for example, along both the right and the left of the pair of cage rows or stacks shown in FIG. 1.

My improved feeding unit and watering unit is positioned between adjacent paired rows of cages as best seen in FIGS. 1 and 3. One form which such feeding and watering means may take is illustrated in FIGS. 7, 8 and 9. The unit is of a length substantially equal to the length of the paired rows and is of a height preferably substantially equal to the height of the stack of the cages in the paired row.

In the construction illustrated in FIGS. 7, 8 and 9, the feeding unit includes an elongated substantially horizontal elevated tube 30 having a longitudinal discharge opening at its central bottom portion at 32. The feed tube mounts rotatably therein a feed-advancing member 34, such as an auger, preferably in the form of a coiled or helical spring. The tube 30 is supported in any suitable manner and, as illustrated in FIGS. 7 and 8, is preferably clamped at spaced intervals by brackets 36 which clamp or grip the tube and which have an upwardly projecting apertured part 38 receiving a suspension cable 40 adapted to be connected to any supporting means (not shown) which is capable of elevating and lowering the unit as desired. It will be understood that one end of each feed tube 30 has communication with the overhead hopper 31 for the supply of feed material thereto, and that the other end of each feed tube will preferably be closed, although it will be understood that various runs of feed tube may be interconnected in units in which the helical spring type of auger 34 is utilized so as to be capable of advance of feed material in such connected feed tube runs. The auger means 34 will be connected to suitable drive mechanism or motor 35, to effect rotation of the auger for the purpose of advancing feed material through the tube.

In the form of construction shown in FIGS. 7 and 8 a pair of longitudinally extending spaced substantially vertical walls 42 extend lengthwise of the tube 30 at opposite sides of the discharge opening 32 thereof and guide the discharge of feed material from the feed tube.

A pair of elongated confronting panels 44 spaced a predetermined distance are positioned below the tube 30 and are characterized by angularly outturned upper trough-forming flanges 46. The panels 44 extend substantially vertically although they may be inclined slightly downwardly and outwardly from the flanges 46, and they are held in selected spaced confronting position in any suitable manner, as by vertical spacers 48 positioned therebetween and secured thereto. Similar pairs of panels are positioned below the first named pairs of panels so as to provide a plurality of sections of the feeder as illustrated in FIGS. 1 and 9. Each of the sections is of a vertical dimension of a cage, and superimposed pairs are held in selected relation to each other by means of the spacers 48. The support of the panels and the spacing thereof relative to the feed tube 30 may be arranged in any suitable manner. Thus, as illustrated in FIGS. 7 and 8, hangers 50 may be positioned at spaced intervals along the plates 42 to which they are secured at their upper ends. The lower ends of the hangers 50 are secured to the flanges 46 of the feed unit therebelow. The arrangement is such that the flanges 46 at opposite sides of the unit cooperate to provide a trough of substantially greater width than the spacing between the outlet plates 42, and granular feed material will flow into this trough and pile up therein, as shown in FIG. 8. The top edges of the flanges of the upper trough will preferably be positioned at a level so correlated to the level of the bottom edges of the walls 42 that, after a certain quantity of feed has accumulated in the trough, flow of feed from the discharge opening between the walls 42 will stop. In other words, the accumulation of feed in the trough acts to valve the outlet from the plates 42. The same arrangement exists between the bottom edges of the plates 44 of an upper pair of feeder plates and the top edges of the trough-forming flanges 46 of the next lower pair of feeder plates.

An alternative construction is illustrated in FIG. 9 wherein inverted U-shaped straps 52 are supported by the tube 30 as spaced intervals therealong and flare outwardly therefrom to engage and support the upper end of the uppermost panel pairs at the flanges 46 thereof, as seen in FIG. 9.

The feeder unit formed of the feeder tube 30, the associated pairs of plates 44 and the troughs 46 will extend substantially the full length of the rows of cages, and end closures 54 will be positioned at the ends of the plates 44 and the troughs 46 to retain and confine feed material at the ends thereof. These end closures may constitute cleats or spacers, such as 48, if desired. It will also be understood that a suitable closure or a trough unit 49 may be positioned at the bottom of the lowermost pair of panels to retain and confine feed between the plates 44. The unit thus constitutes a long, narrow, vertical container in which a quantity of granular feed material will be stored at all times. The feed material is accessible at each of the troughs 46 at a level adjacent to one tier of cages and along the full length thereof, so that all chickens in the cages in that tier will have a continually available supply of granular feed material which they may eat. As the granular feed material is eaten and withdrawn, the feed material thereabove and that in the feed tube 30 will fall by gravity so as to automatically replenish the feed at each trough. It will be observed that fowl in the cages on opposite sides of the feeder unit have equal access to the feed, as illustrated in FIG. 1, when the rows of cages are positioned close enough to the feeder to enable fowl in the cages to reach and eat it.

Means are provided for supplying water to all fowl in the cages. For this purpose a plurality of longitudinal water troughs 60 are carried by the feed unit at opposite sides thereof at and adjacent to the trough flanges 46. For this purpose each of the panels 44 may be provided with apertures 62 at a selected vertical elevation and spaced along its length. The water troughs 60 preferably include an inner wall adapted to bear in face engagement with a panel 44 and having at its upper margin at spaced intervals inwardly projecting hooks 64 adapted to fit in the openings 62 to support the water trough in selected location to be accessible to fowl in a cage as illustrated in FIG. 7.

Figure 2:
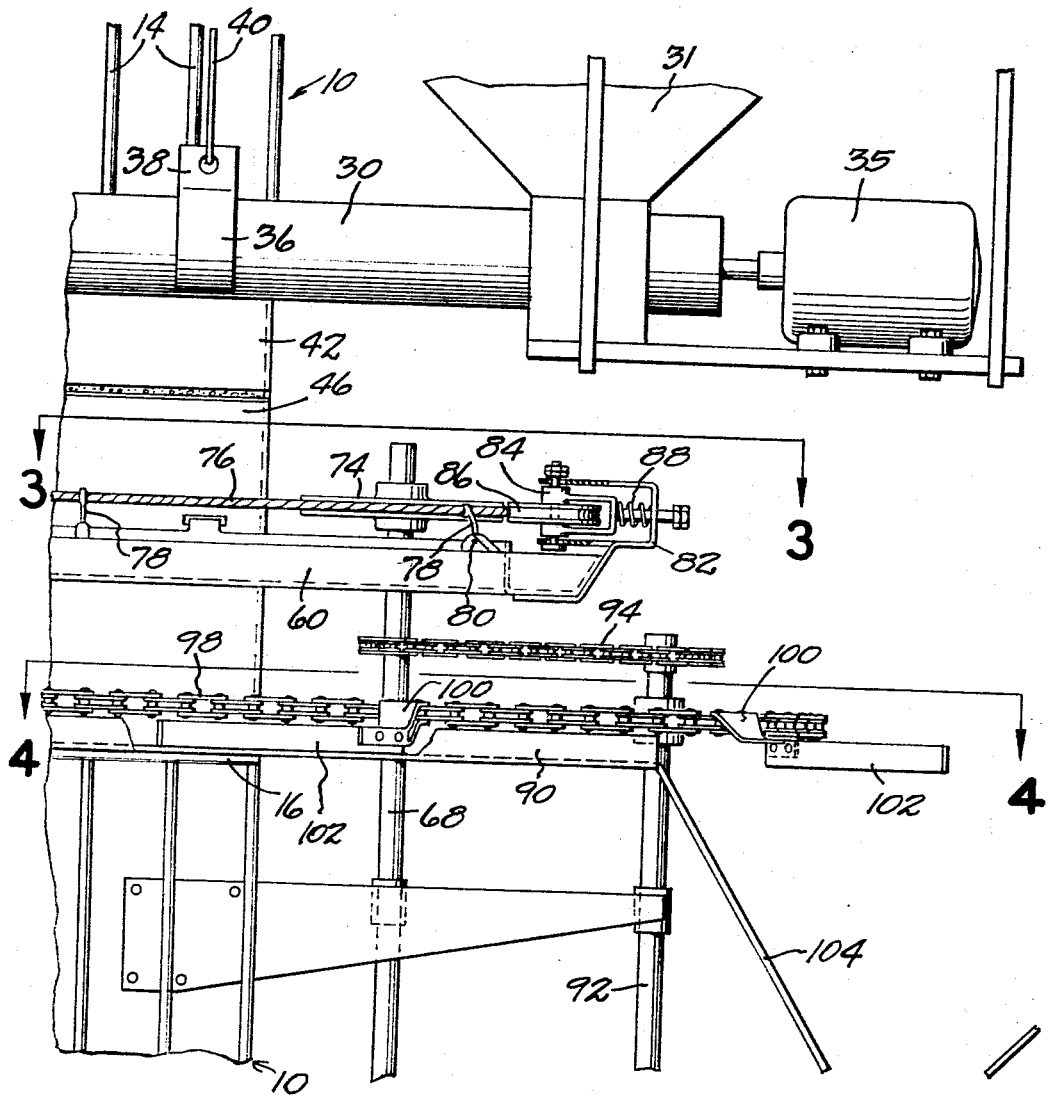
FIG. 2 is a fragmentary enlarged view taken on line 2—2 of FIG. 1.

In the preferred arrangement, the water troughs at each level and at opposite sides of the feed unit are interconnected by arcuate end portions 66, as best seen in FIGS. 2 and 3, said arcuate end parts being substantially concentric with vertical shafts 68. A single water trough will thus be provided of endless nature, which has a water supply line 70 and overflow and discharge line 72 to provide continuous supply and circulation of fresh water.

Means are preferably provided for cleaning the water trough, and for this purpose the shafts 68 will preferably mount pulleys 74 preferably located above the level of the water trough 60, as best seen in FIG. 2. One of the shafts 68 will have a driving connection with a motor or other prime mover (not shown). A cable or other flexible endless member 76 is trained around the pulleys 74, and at spaced intervals along its length the cable mounts arms 78 each carrying a brush 80 or other cleaning member adapted to engage the inner surfaces of the water trough 60 as illustrated at the right in FIG. 8. The brush or scraper means 80 serve to dislodge sediment which has precipitated in the container and advances the same through the trough for discharge at the outlets 72. In order to insure an effective drive of the cable 76 from the pulleys 74, the trough may mount a bracket 82 at one curved end or portion 66 thereof adjacent to a pulley 74, which bracket loosely carries a yoke 84 journaling a friction disk 86. Spring means 88 are interposed between the bracket 82 and the yoke 84 to urge the friction disk 86 against the cable 76 as it passes around a pulley 74 so as to impart a drive transmitting action from the pulley to the cable 76.

If desired, the feeder may carry deflecting members 61 below each trough, see FIG. 1, to prevent soaking of feed in lower troughs if a water trough at a higher level should leak. Also, to protect against soaking of feed from leaking water, the water troughs may be mounted remotely from the feeding unit, as at the outer sides of the cages.

Suitable means are provided to extend below each cage for the purpose of collecting droppings from the cage and discharging them at a collection point. One such means is illustrated in FIGS. 1, 2, 4 and 5. A collecting trough 90 of a width only slightly narrower than the width of the cage 10 is positioned therebelow. Thus the trough 90 below the uppermost tier of cages may bear upon the top of the tier of cages next below, as illustrated in FIG. 1. Each collecting trough is of a length substantially equal to or coextensive with the tier of cages under which it extends, or may extend outwardly beyond the endmost cage 10, as illustrated in FIG. 2, and adjacent to a vertical shaft 92 adjacent to a shaft 68 and having a common drive connection therewith, as through chain and sprocket drive transmission 94. Each vertical shaft 92 carries a sprocket 96, preferably at a level slightly above the adjacent trough 90, and an endless drive member, such as a chain 98, is trained around the sprockets 96. The chain 98 is adapted to travel along the inner margin of a trough 90, as seen in FIG. 4. At spaced intervals the chain 98 mounts brackets 100, and to each bracket 100 is secured a scraper member or blade 102 which is adapted to traverse the trough 90 and to scrape therefrom and propel thereon the collected droppings for discharge to a delivery chute 104.

It will be understood that the shafts 68 and 92 may have independent drive means if desired. Also, each drive means will be selectively operable so that both the water trough brushing means and the collecting trough scrapping means need not be operated continuously, but, instead, can be operated periodically as required. It will also be apparent that the shafts 68 and 92 may be of a vertical dimension providing for operation of the water trough brushing means and the collecting trough scraping means at each of multiple tiers of cages.

Any suitable egg-collecting means may be provided in association with the cages in each row at each tier. Such means are illustrated in FIGS. 1 and 6. In the FIG. 1 construction a bracket 110 projects laterally from the lower end of the inclined bottom of the cage and carries a channel 112 supporting a run of an endless belt 114 extending alongside and parallel to the tier of cages. Belt 114 is trained around pulleys 118 suitably supported and connected to a drive shaft with selectively operable drive means.

In the construction illustrated in FIG. 6, the upper run of a belt 114 slides along the upper face of a channel or other horizontal structural member 24 carried by uprights 22, which uprights mount brackets within which are journaled cross-shafts 120 at each tier of cages and serve to mount the pulleys 118. It will be understood that final egg-collecting means from each tier may take varied forms. Thus at the lower left part of FIG. 6 is shown a collecting trough 122 extending transversely of the adjacent belt 114 at one end thereof and mounting a belt 124 which may extend to a remote or central collecting station. Collecting trough 122 may include an inclined ramp part 126 on which eggs roll from the belt 114 to the trough 122 and the belt 124 thereon.

Another alternate construction is shown at the upper part in FIG. 6 wherein the channel 24' or other structural member extends beyond the end of the row of cages 10, and the belt 114 likewise extends therealong past the end of the row of cages to a collecting station (not shown) which may be located in a different room than the room in which the cages are mounted. Suitable drive means (not shown) under selective control will be provided for operating the belts, such as the belts 114 and 124, at periodic intervals to deliver eggs which have accumulated in the interim upon the collecting belt 114. It will be understood that the vertical bars 14' at the side of the cage of greatest vertical dimension will terminate at 14' spaced above the bottom of the cage so that eggs laid by chickens in the cages will roll along the inclined bottom grill 12 of the cage below and clear of the side grill parts 14' and onto the adjacent collecting belt 114.

The apparatus provides means by which a large number of chickens in cages can be maintained with minimum manual exertion and with a maximum degree of automation. Thus all chickens in all cages in all tiers of each of a pair of rows are assured of adequate food available at all times, through the medium of the feed dispenser unit which automatically positively provides, in an accessible position relative to each cage, a quantity of food at a trough portion 46. Likewise readily accessible by chickens in each cage in each tier of both rows is a quantity of water which is preferably circulated constantly and which is purged of accumulated precipitations periodically by the brushing means herein described. Similarly, the removal of droppings is performed automatically. It is of particular interest to observe that each of the feeding means, watering means and dropping collection means are oriented together. This makes it possible to produce an inexpensive compact unit to which access can be secured for repair and maintenance by simply moving a row of cages to afford such access. At the same time, egg collection means are readily accessible at the aisles between pairs of rows of cages, and these are totally independent of the feeding means and associated parts.

While the preferred embodiment of the invention has been illustrated and described, it will be understood that changes in the construction may be made within the scope of the appended claims without departing from the spirit of the invention.

What is claimed is:
1. A chicken feeding device comprising,
a horizontal screw conveyor having a longitudinal bottom discharge opening,
a first assembly suspended from said conveyor and including a V-shaped feed trough beneath said conveyor discharge opening, downwardly extending feed confining panels depending from and communicating with said feed trough and open at the bottom thereof, a water trough supported by a panel below said feed trough and an inclined feed and water deflector carried by a panel below said water trough,
a second assembly of feed trough, feed confining panels, water trough and feed and water deflector similar to and positioned below said first assembly to receive feed material from the bottom opening of said first assembly,
a bottom feed retaining trough positioned below the lowermost assembly and receiving feed material from the bottom opening of the lowermost assembly,
said troughs being spaced from the adjacent discharge openings thereabove to collect feed material to a height closing the discharge opening thereabove, and
support means for said conveyor, said assemblies and said bottom trough.
2. A chicken feeding device as defined in claim 1, and means continuously circulating water in each trough at a selected level, and
selectively operable cleaning means traversing each water trough to dislodge foreign material precipitated therein.
3. A chicken feeding device comprising
a horizontal screw conveyor having a longitudinal bottom discharge opening,
a first assembly positioned below said conveyor and including a V-shaped feed trough beneath said conveyor discharge opening, downwardly extending feed confining panels depending from and communicating with said feed trough and open at the bottom thereof, water troughs supported by said panels at opposite sides and inclined feed and water deflectors carried by said panels at opposite sides and below said water troughs,
a second assembly of feed trough, feed confining panels, water troughs and deflectors similar to and positioned below said discharge opening of said first assembly,
a bottom feed retaining trough positioned below the lowermost assembly and receiving feed material from the bottom opening of the lowermost assembly,
support means for said conveyor, said assemblies and said bottom trough,
said troughs being spaced from the adjacent discharge openings thereabove to collect feed material to a height closing the discharge opening thereabove, and
two rows of chicken cages arranged in multiple superimposed tiers at opposite sides of said troughs with the cages of each tier juxtaposed to a feed trough and a water trough.

4. A chicken feeding device as defined in claim 3, wherein
   said water troughs of each assembly are interconnected to define an endless trough,
   means for circulating water in each endless trough at selected level, and
   selectively operable cleaning means traversing each endless trough to dislodge foreign material collected therein.

5. A chicken feeding device as defined in claim 3, wherein said cages each have an inclined bottom and a side with an egg discharge opening therein at the lowermost part of said bottom, and
   an elongated egg collector alongside said egg discharge openings of each tier of each row,
   said egg collector including a selectively operable conveyor.

6. A chicken feeding device as defined in claim 3, and an elongated collector of droppings positioned below each tier of cages in each row, and
   selectively operable means for scraping said collectors.

References Cited by the Examiner
UNITED STATES PATENTS

| | | | |
|---|---|---|---|
| 1,102,004 | 6/1914 | Conboie | 119—63 |
| 2,043,595 | 6/1936 | Raymond | 119—51 |
| 2,863,418 | 12/1958 | Pockman | 119—48 X |
| 2,914,023 | 11/1959 | Pierre | 119—52 |
| 3,037,611 | 6/1962 | Majorowicz | 198—64 |
| 3,053,227 | 9/1962 | Mitchell | 119—52 |
| 3,071,109 | 1/1963 | Pierre | 119—22 |
| 3,119,375 | 1/1964 | Ernst | 119—48 |
| 3,225,741 | 12/1965 | Ernst | 118—18 X |

FOREIGN PATENTS 967,112   8/1964   Great Britain.

SAMUEL KOREN, *Primary Examiner.*

ALDRICH F. MEDBERY, *Examiner.*